Jan. 3, 1928.
G. W. McCUNE
1,654,595
MEANS FOR CENTRALIZING PISTONS
Filed July 22, 1926
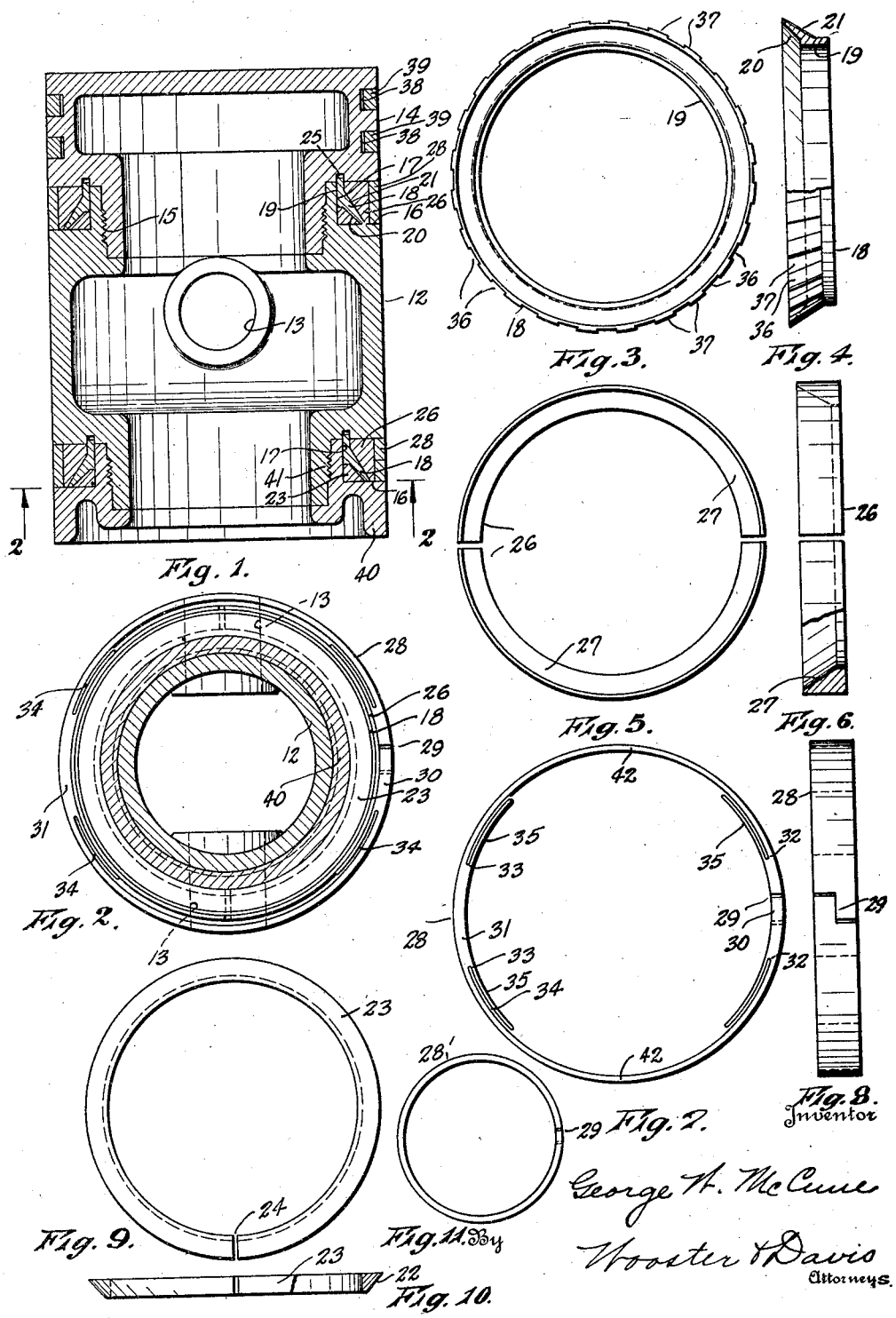

Patented Jan. 3, 1928.

1,654,595

UNITED STATES PATENT OFFICE.

GEORGE W. McCUNE, OF BRIDGEPORT, CONNECTICUT, ASSIGNOR OF ONE-HALF TO JOHN A. CORNELL, OF BRIDGEPORT, CONNECTICUT.

MEANS FOR CENTRALIZING PISTONS.

Application filed July 22, 1926. Serial No. 124,180.

This invention relates to a centering device for pistons and similar devices, and has for an object to provide a simple and efficient structure which will automatically maintain a piston or similar device in the center of the cylinder. It may also, if desired, be used as a packing ring to prevent leakage of the gases by the piston when used for such devices as internal combustion engine pistons.

In the drawing I have shown the device as applied to a piston for internal combustion motors, but it is not limited to use therewith as it may be used on other types of pistons. Another and important use for which it may be employed is in a rifling head for rifling large guns, in which use it will maintain the head absolutely central of the bore of the gun and will prevent chattering of the head and tools during the rifling operation. It is well known that in internal combustion engines, for example, the cylinders with ordinary pistons wear unevenly, especially in the V-types of motors where the cylinders are inclined, so that they are soon out of round or become somewhat oval shape as there is greater wear on the sides in the plane of the connecting rod than on the sides at right angles thereto, and as this uneven wear cannot be truly compensated for there is soon a leakage of gases past the piston as the piston no longer fits the cylinder. My device operates to automatically maintain the piston in the exact center of the cylinder thus causing uniform wearing of the piston rings and the cylinder and maintaining the proper fit between the same to give the proper and efficient operation.

Referring to the accompanying drawing,

Fig. 1 is a longitudinal section through a piston for gasoline engines showing my improved centering device applied thereto.

Fig. 2 is a transverse section substantially on line 2—2 of Fig. 1.

Fig. 3 is an end view of the continuous longitudinally movable ring employed in the device.

Fig. 4 is a partial side elevation and partial section thereof.

Fig. 5 is an end view of the segmental ring which cooperates with the continuous ring of Figs. 3 and 4.

Fig. 6 is a side elevation thereof.

Fig. 7 is an end view of one form of the split ring which embraces the segmental ring and engages the surface of the cylinder.

Fig. 8 is a side elevation thereof.

Fig. 9 is an end view of a spring ring used in the device.

Fig. 10 is a side elevation thereof, and

Fig. 11 is an end view of a slightly different construction of split ring which may be used in place of the ring shown in Figs. 7 and 8.

The piston shown comprises a body 12 which, of course, is substantially cylindrical in cross section and has transverse openings 13 for the wrist pin for a connecting rod not shown. In the construction shown the body is formed in two or more sections, the head section 14 being separate from the other section and secured thereto by the screw threads 15. The body is provided with an annular groove 16 in the side wall thereof, the opposite sides of this groove being formed on the two sections of the body. One of the sections, in the present construction the main section, has a cylindrical wall 17 which is concentric with the axis of the piston and forms the bottom of the groove 16, and mounted to fit this wall and longitudinally slidable thereon is a continuous ring 18. This ring has an inner cylindrical wall 19 which fits the wall 17 in the bottom of the groove with a sliding fit so that the ring is slidable longitudinally of the piston but is held by these cylindrical walls against radial movement. The continuous ring also has inner and outer tapered or inclined walls 20 and 21 respectively. The inner wall 20 engages the correspondingly tapered wall 22 on a spring ring 23. This ring is cut at one side so that the ring may expand or contract and it is made of such a size that when placed in the groove in engagement with the continuous ring 18 it is compressed somewhat and normally tends to expand to press against the tapered surface 20 on the continuous ring, and by a camming action thereon tends to shift this ring longitudinally of the piston. At one side of the groove 16 is an undercut groove 25 providing a clearance to permit this longitudinal movement of the ring 18.

Mounted in the groove 16 outside of the continuous ring 18 is a sectional ring 26. In the present construction this ring is made in two sections but it may be made in three, four or more sections as desired, and it has a tapered inner surface 27 to engage the outer tapered surface 21 on the continuous ring 18. This sectional ring is preferably of a width substantially the same as that of the groove 16 so that it is guided for radial movement in this groove by the opposite side walls thereof. Outside of this sectional ring and embraced thereby is a split ring 28 which is also guided at its sides in the groove and whose outer wall in use engages the inner surface of the cylinder in which the piston is mounted. When used for internal combustion engines this ring preferably has a lapped joint 29 at its cut side to prevent leakage of gas past the ring. The outer wall of the sectional ring 26 is preferably substantially cylindrical and the split ring 28 may be either of uniform thickness, as shown in Fig. 11, or it may have the structures shown in Figs. 7 and 8. The ring 28' of uniform thickness shown in Fig. 11 is preferred for use in new constructions where the cylinders and piston are substantially cylindrical, while the ring shown in Figs. 7 and 8 is preferred where the device is applied to old pistons which are used in cylinders which have become somewhat worn and are no longer absolutely round, and it will, of course, be understood either ring may be used either in the old or new constructions. In the ring shown in Figs. 7 and 8 the walls are of the usual thickness on the two opposite sides thereof, as indicated at 30 and 31, and it is so placed in the piston that these sides are at right angles to the plane of the wrist pin or that is are in the plane of the connecting rod, so that they are on the sides of the piston where the greatest wear occurs and are also where there is the greatest lateral pressure on the piston. The wall of the ring is cut away on the inner side, as shown in Fig. 7, between the points 32 and 33 so as to make the walls 42 somewhat more flexible and will thus conform more readily to the irregular surface of a worn cylinder. The walls are somewhat undercut for a suitable distance, as shown at 34, to leave tongues or projections 35 to give a greater bearing on the sectional ring 26 but give the required flexibility to the walls of the ring.

It is preferred that the outer tapered surface 21 of the continuous ring 18 be not left continuous as it is difficult to secure a proper fit. It is, therefore, preferred to remove small portions of the wall of the ring by means of notches or grooves 36 to form spaced bearing surfaces 37 which will together form the tapered wall 21. With this construction the engaging walls of the two rings 18 and 26 will be less likely to stick or bind in operation.

As the piston is made in two sections it will be apparent that the spring ring 23 and the continuous ring 18 may be placed on the cylindrical wall 17 and held there by attaching the head section 14 of the piston. The sectional ring 26 and the split ring 28 may be applied either before or after the two sections of the piston are assembled.

In operation, as the spring ring 23 is compressed when placed in position it tends to expand and by the camming action of the tapered wall 22 against the tapered wall 20 on the continuous ring 18 will tend to slide this ring longitudinally on the cylindrical surface 17. This movement of the continuous ring will, of course, be concentric with the longitudinal axis of the piston as the wall 17 is concentric therewith, so that this ring is always properly centered. This longitudinal movement of the ring 18 will cause the outer tapered wall 21 to have a camming action on the tapered surface 27 of the sectional ring 26, and as these sections are guided by the sides of the groove 16 against longitudinal movement, will tend to force these sections outwardly against the inner surface of the split ring 28 and will tend to expand the same and hold it in proper engagement with the inner wall of the cylinder. Thus, as the ring 18 is always properly centered on the piston and is held against radial movement, the piston will be held by this construction always in the center of the cylinder. By using a lapped joint, as shown at 29, on the split ring 28 this ring may also be used to prevent leakage of gas by the piston, but the main function is to maintain the piston always in the center of the cylinder. In the drawing the head 14 is also shown as provided with grooves 38 for any of the usual types of the ordinary expansion rings 39.

If desired two sets of centering devices may be used on a single piston and this is the construction shown in the drawing. To accommodate such a construction the opposite end of the piston includes a removable section 40 secured to the main section by screw threads 41 and forming a groove 16 with the main section the same as the head 14. In this construction, however, the cylindrical wall 17 is formed on the removable section.

Having thus set forth the nature of my invention, what I claim is:

1. In combination, a cylindrical body having an annular groove with a cylindrical surface at the bottom thereof, a continuous ring having a cylindrical surface fitting that of the groove and slidable thereon, said ring having inclined inner and outer surfaces, one of said surfaces comprising a plurality of spaced bearing surfaces extending in the direction of inclination, a resilient ring tending to push outwardly on said inner surface to slide the continuous ring, a sectional ring engaging the outer surface of the continuous ring, and a split ring embracing the sectional ring.

2. In combination, a cylindrical body having an annular groove with a cylindrical surface at the bottom thereof, a ring having a cylindrical surface fitting that of the groove and slidable thereon, said ring having a tapered outer surface including a plurality of spaced bearing surfaces extending longitudinally of the taper, a sectional ring embracing the ring and having a tapered surface engaging that of the first ring, resilient means tending to slide the ring on the cylindrical surface and against the sectional ring, and a split ring embracing the sectional ring.

3. In combination, a cylindrical body having an annular groove in its side wall, a continuous ring mounted for longitudinal movement in said groove, a sectional ring embracing the continuous ring and guided for radial movement in the groove, said rings being provided with coacting tapered surfaces with the outer surface on the continuous ring including a plurality of spaced bearing surfaces extending longitudinally of the taper, a split ring embracing the sectional ring, and a spring tending to slide the first ring longitudinally to expand the sectional ring.

4. In combination, a cylindrical body having an annular groove in its side wall, a ring mounted for longitudinal movement in said groove and held against radial movement, a split ring in the groove mounted for radial movement, said latter ring being of normal thickness at diametrically opposite sides and of a reduced thickness between these sides to render these walls of the ring more flexible, means between the rings operating on movement of the first ring to expand the split ring, and a spring tending to shift the first ring.

5. In combination, a cylindrical body having an annular groove in its side wall, a continuous ring mounted for longitudinal movement in said groove and held against radial movement, said ring having inner and outer tapered surfaces, a split resilient ring having a tapered surface engaging the inner surface of the first ring and tending to shift said ring horizontally, a sectional ring mounted for radial movement in the groove and having an inner tapered surface to engage the outer surface of the first ring, and a split ring embracing the sectional ring, having diametrically opposite walls of normal thickness engaging said sectional ring and intermediate walls of a less thickness to render these walls more flexible.

6. In combination, a cylindrical body having an annular groove with a cylindrical surface at the bottom thereof, a ring having a cylindrical surface fitting that of the groove and slidable thereon, a split ring in the groove mounted for radial movement, means between the rings operating on movement of the first ring to expand the split ring, said split ring having walls of a given thickness on the sides where the greater pressure and wear occur and walls of a less thickness intermediate these first walls to render them more flexible, and a spring tending to shift the first ring.

7. In combination a cylindrical body having a groove in its side wall, a member in said groove mounted for longitudinal movement and held against radial movement, a split ring, cooperating means between the member and the ring to expand the ring upon movement of said member, said split ring having walls of a given thickness on the opposite sides where the greater pressure and wear occur and intermediate walls of a less thickness, the thicker walls being undercut at the opposite ends thereof to increase the length of the thinner walls, and resilient means tending to shift said member.

In testimony whereof I affix my signature.

GEORGE W. McCUNE.